F. CASTIGLIONI.
SYSTEM OF ELECTRICAL DISTRIBUTION.
APPLICATION FILED AUG. 28, 1912.
1,167,382.
Patented Jan. 11, 1916.
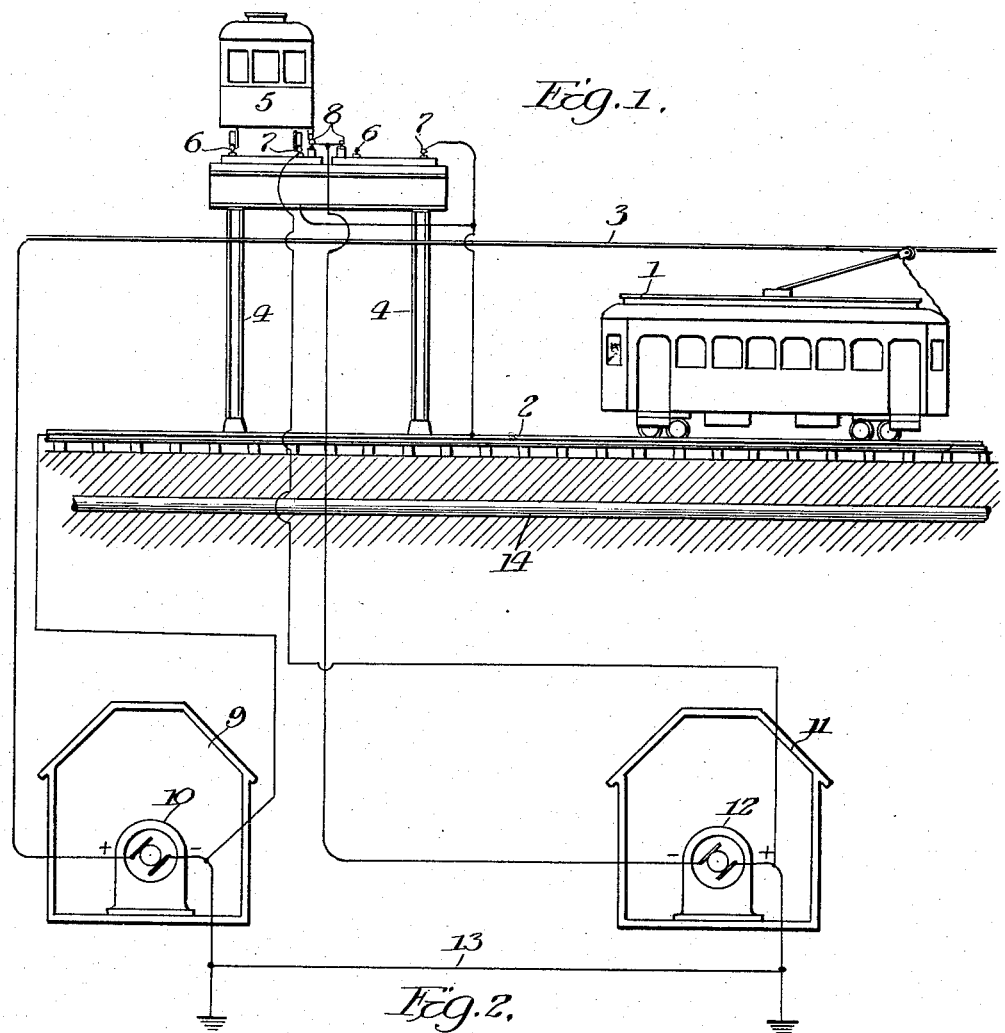
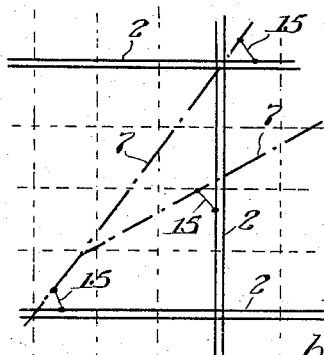

UNITED STATES PATENT OFFICE.

FERRUCCIO CASTIGLIONI, OF WILMETTE, ILLINOIS.

SYSTEM OF ELECTRICAL DISTRIBUTION.

1,167,382.  Specification of Letters Patent.  Patented Jan. 11, 1916.

Application filed August 28, 1912. Serial No. 717,460.

*To all whom it may concern:*

Be it known that I, FERRUCCIO CASTIGLIONI, a subject of the King of Italy, residing at Wilmette, in the county of Cook and State of Illinois, have invented a certain new and useful Improvement in Systems of Electrical Distribution, of which the following is a full, clear, concise, and exact description, reference being had to the accompanying drawings, forming a part of this specification.

My invention relates to systems of electrical distribution for power, traction and the like.

The object of the present invention is to prevent or reduce electrolysis, or electrolytic effects in gas, water and other pipes and devices laid underground in the territory in which the electrical system is located; to minimize the cost of such an arrangement, and in fact to bring the cost within reach of practical application; and to accomplish the foregoing in a simple and expeditious manner.

In the accompanying drawings Figure 1 is an illustration more or less diagrammatic of an electrical system of distribution embodying my present invention, and Fig. 2 is a diagrammatic plan view of the street arrangement of said system.

The drawing or view is illustrative of the trolley system and also of an overhead or elevated system, together with the connections and apparatus and cars therefor. For example, the trolley or surface system is illustrated by a trolley car 1, running on rails 2, and having its trolley pole in connection with the trolley wire 3. The overhead or elevated system is represented by the elevated structure 4 on which is shown a car 5 traveling on rails 6 and 7. A third rail 8 is also shown mounted on the elevated structure alongside of the other rails for the usual purpose.

I have shown also the power house 9 for the trolley system, said power house containing one or more generators 10, the positive pole of which is preferably connected with the trolley wires 3, and the negative pole of which is grounded and connected to the rails 2; the current thus being fed to the trolley system from the positive pole of the generator or generators and returned through the rails and the connection between the rails and the negative side of the generator.

I have also shown the power house 11 of the elevated system containing a generator or generators 12, the negative pole of which is preferably connected with the third or feed rail 8 of the elevated structure, and the positive pole of which is grounded and connected to the rails 7. Thus in the elevated system the current supply is reversed from that in the trolley system, the negative pole being connected with the supply or feed wires and the return being to the positive pole of the generator.

I have also shown a connection 13 between the grounded terminals of the power houses 9 and 11. I have also shown a pipe 14 embedded in the ground, such pipe being merely illustrative of a gas or water pipe or other embedded article or device in which in so many cases damaging electrolytic effects take place.

I have also shown return or rails 7—7 of the elevated system connected with the rails 2—2 of the trolley, this being a very important feature of the invention, and it being understood that the rails are thus connected together in many points where it can be done with insignificant expenditure. It will here be explained that the elevated system is insulated or substantially insulated from the ground, while the trolley or surface system is non-insulated with respect to the ground. By reason of the reversed arrangement of the generators, as hereinbefore described, the potential of the carrying rails 2 of the surface or trolley system will be higher than that of the running rails 7 of the insulated or substantially insulated elevated system, and therefore the flow of current is necessarily from the rails of the surface system to the rails of the insulated or elevated system. The arrangement thus forms a special application of the "three wire system," which will find its use in the cities furnished with different traction systems, and which for its special features of low cost, abolition of any difficulty in installation, operation and maintenance, and independence of the various services presents itself as a new application. It will be seen that the rail nets of the different railway systems, which are already laid out, of great section and over almost the same zones, will simply take the place of the "third wire", and all the return currents of equal intensity and different polarity will neutralize each other at the many points where the junction can be made with minimum expense, causing to flow back to the power houses only the differences of the return currents. As the "rush hours" almost correspond for all systems, the distribution regulates itself automatically, never allowing these differences to grow great if the location of the junction points has been made so as to hold also the partial sums within certain limits. Thus is formed a system of reducing electrolysis damage by dividing the large volumes of rail currents in the main return lines to the power houses, in different relatively small partial volumes which follow different and shorter routes for returns.

In Fig. 2 I have shown an illustration of the connections, the elevated tracks being indicated by 7, and the trolley tracks by 2, and the connections by 15. The advantages are: The feeding areas or overhead systems remain unchanged, a great advantage compared with other applications of the same idea, with their difficulties in the crossings, switch points, etc. Also the power houses of the different traction systems remain untouched, another big advantage for economic reasons, facility of operation and full utilization of the reserves. The different systems operate perfectly independent, as before, and there is no necessity of balance of the loads of opposite potential and even of equality of potential.

The adoption of this system in the big cities not only will minimize or eliminate the electrolysis current, but also will represent an everyday very important saving, scores of thousands of kilowatt hours choosing a shorter way for their returns.

It will be noticed that the invention is described by way of example in connection with two different kinds of traction systems, that is surface lines and elevated systems. The invention is capable of use with other systems, however, for example with surface lines and underground or with surface lines, underground and elevated, by combining the same in the manner to obtain the best balance or equalization of loads.

The connection between the grounds of the two power houses can be effected by means of the existing network of rails; but in case special connections may seem necessary they can be provided without great expense. The essential thing is to have the generators of the several systems in circuit, which can be accomplished by grounding the negative terminal of one and the positive terminal of the other where the power houses are sufficiently close together, but where the power houses are relatively remote the terminals should be electrically connected by a metallic conductor.

In the claims, I have made use of the expression "independent and physically distinct electric traction systems" and this expression is intended to mean surface and elevated systems, surface and subway systems, or a combination of these three different systems.

It will be understood that changes and modifications can be made without departing from the spirit of the invention.

What I claim is:

1. In a system of electrical distribution, the combination of D. C. electric traction systems disposed at different elevations and having no contact crossings of the feed conductors of one system with those of the other system, each traction system having its own generator, running rails and supply conductor, the running rails of one traction system constituting the positive or feeder of said system, and reversely the running rails of the other traction system constituting the negative or return of its system, the generators of the several reversed systems being in circuit, and a plurality of low resistance bonds extending from the running rails of one system to the running rails of the other system, whereby the tracks of the connected systems form the third wire of a three-wire system and leakage of current from the running rails of the connected systems is prevented or reduced.

2. In a system of electrical distribution, the combination of D. C. electric traction systems disposed at different elevations and having no contact crossings of the feed conductors of one system with those of the other system, each traction system having its own generator, running rails and supply conductor, the running rails of one traction system constituting the positive or feeder of said system, and reversely the running rails of the other traction system constituting the negative or return of its system, and a plurality of low resistance bonds extending from the running rails of one system to the running rails of the other system, whereby the tracks of the connected systems form the third wire of a three-wire system and leakage of current from the running rails of the connected systems is prevented or reduced, and an electric connection between the terminals of the reversed generators.

In witness whereof, I hereunto subscribe my name this 26th day of August, A. D., 1912.

FERRUCCIO CASTIGLIONI.

Witnesses:
  A. MINER BELFIELD,
  A. L. JONES.

Copies of this patent may be obtained for five cents each, by addressing the "Commissioner of Patents, Washington, D. C."